(12) United States Patent
Bradley et al.

(10) Patent No.: US 11,099,341 B1
(45) Date of Patent: Aug. 24, 2021

(54) ACTIVE OPTICAL CABLE ASSEMBLY WITH MULTICORE FIBER

(71) Applicant: OFS Fitel, LLC, Norcross, GA (US)

(72) Inventors: Kelvin B Bradley, Lawrenceville, GA (US); Eric J Leichter, Buford, GA (US); Gregory A Sandels, Buford, GA (US)

(73) Assignee: OFS Fitel, LLC, Norcross, GA (US)

( * ) Notice: Subject to any disclaimer, the term of this patent is extended or adjusted under 35 U.S.C. 154(b) by 0 days.

(21) Appl. No.: 16/865,371

(22) Filed: May 3, 2020

(51) Int. Cl.
*G02B 6/43* (2006.01)
*G02B 6/42* (2006.01)
*G02B 6/02* (2006.01)

(52) U.S. Cl.
CPC ............ *G02B 6/43* (2013.01); *G02B 6/02042* (2013.01); *G02B 6/4246* (2013.01)

(58) Field of Classification Search
None
See application file for complete search history.

(56) References Cited

U.S. PATENT DOCUMENTS

| 10,234,644 B1* | 3/2019 | Butler | G02B 6/125 |
|---|---|---|---|
| 2007/0183709 A1* | 8/2007 | Furuno | G02B 6/4204 |
| | | | 385/14 |
| 2007/0237462 A1* | 10/2007 | Aronson | G02B 6/4416 |
| | | | 385/89 |
| 2010/0178007 A1* | 7/2010 | Thomson | G02B 6/30 |
| | | | 385/55 |
| 2011/0274438 A1* | 11/2011 | Fiorentino | G02B 6/43 |
| | | | 398/141 |
| 2012/0301073 A1* | 11/2012 | DeMeritt | G02B 6/4284 |
| | | | 385/14 |
| 2015/0323735 A1* | 11/2015 | Ishida | G02B 6/02 |
| | | | 385/124 |
| 2016/0231508 A1* | 8/2016 | Butler | G02B 6/12004 |

FOREIGN PATENT DOCUMENTS

| JP | 2013-76893 A | * | 4/2013 |
|---|---|---|---|
| JP | 2018-124307 A | * | 8/2018 |

* cited by examiner

*Primary Examiner* — Michael Stahl
(74) *Attorney, Agent, or Firm* — Smith, Temel, Blaha LLC; John Harm, Esq.

(57) ABSTRACT

An active optical cable may include a multicore optical fiber, a connector housing, a mateable electrical connector, an array of optoelectronic converter devices in the connector housing, and an optical waveguide structure. The optical waveguide structure is configured to couple optical signals between the fiber cores and the optoelectronic converter devices in the connector housing.

14 Claims, 9 Drawing Sheets

ACTIVE OPTICAL CABLE ASSEMBLY WITH MULTICORE FIBER

BACKGROUND

An optical fiber cable generally comprises two or more optical fibers enclosed within a sheath or jacket. The term "active optical cable" (AOC) may be used to refer to an optical fiber cable having electrical connectors at its ends and optoelectronic components that convert between electrical and optical signal formats. The optoelectronic components may be contained within the connector housings. To provide multiple data communication channels, an AOC commonly includes multiple fibers, each coupled to one of the optoelectronic components in a connector. Optoelectronic components of AOCs commonly include one or more photodiodes (e.g., PIN diodes) or other light sources configured to convert optical signals to electrical signals, and one or more lasers (e.g., VCSELs, LEDs, etc.) or other light detectors configured to convert electrical signals to optical signals. Each connector may include an optoelectronic transceiver comprising one or more light sources and one or more light detectors. An array of optoelectronic components may be mounted on a circuit board or similar substrate oriented parallel to the axes of the fiber ends, and a reflector assembly may be mounted over the circuit board to redirect optical signals between a direction parallel to the circuit board and a direction normal to the circuit board.

Cable installation time, cable space requirements, and cable management difficulties generally increase with the number of fibers in a cable. It would be desirable to provide a more compact multi-channel AOC.

SUMMARY

Embodiments of the invention relate to active optical cables (AOCs). An AOC may include an optical waveguide structure configured to couple optical signals between the fiber cores and optoelectronic converter devices in a connector housing.

An exemplary embodiment of an AOC may include a multicore optical fiber, a connector housing, an electrical connector, a plurality of optoelectronic converter devices, and an optical waveguide structure having a plurality of waveguides. The multicore optical fiber has a plurality of cores contained within a cladding. A first end of the multicore optical fiber extends into the connector housing. The electrical connector may be mounted in the connector housing. The electrical connector has a portion mateable with a mating connector of a data device through an opening in the connector housing. Each optoelectronic converter device is electrically coupled to a corresponding conductor of the electrical connector. Each optical waveguide is optically coupled between one of the cores and the optical face of one of the optoelectronic converter devices.

Other systems, methods, features, and advantages will be or become apparent to one of skill in the art upon examination of the following figures and detailed description. It is intended that all such additional systems, methods, features, and advantages be included within this description, be within the scope of the specification, and be protected by the accompanying claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention.

DETAILED DESCRIPTION

Figure 1:
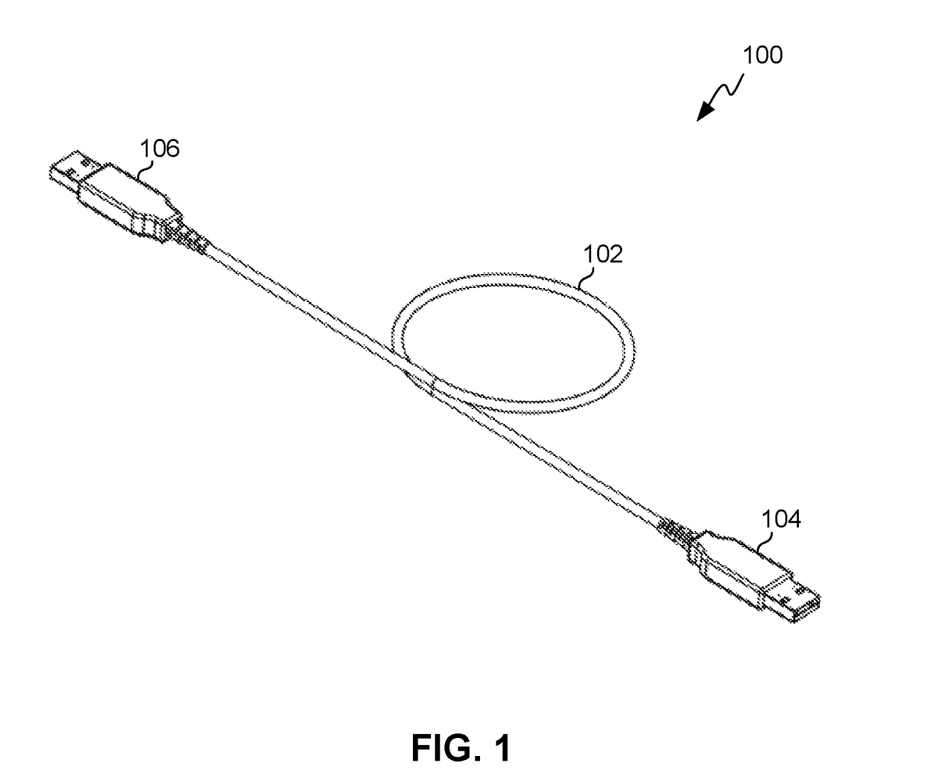
FIG. 1 is a perspective view of an active optical cable, in accordance with exemplary embodiments.

As illustrated in FIG. 1, an active optical cable (AOC) 100 may include a cable 102 having a first end coupled to a first connector 104 and a second end coupled to a second connector 106. In the illustrated embodiment, the cable 102 may consist of a single multicore optical fiber 200 (FIG. 2) within a jacket (not shown). Nevertheless, in other embodiments (not shown) such a cable may include more than one multicore optical fiber.

Figure 2:
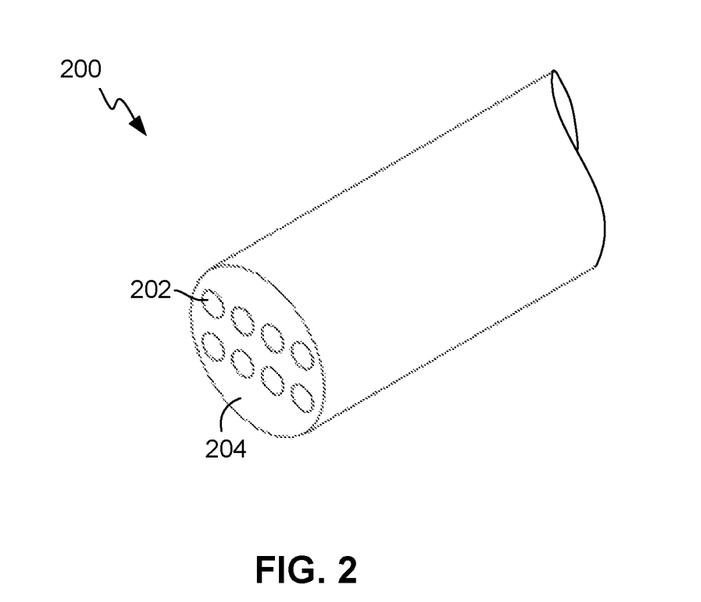
FIG. 2 is a perspective view of an end of a multicore fiber of the active optical cable of FIG. 1.

As illustrated in FIG. 2, the multicore optical fiber 200 has two or more cores 202 surrounded by a cladding 204. For example, the multicore optical fiber 200 may have eight cores 202. Although in the illustrated embodiment the eight cores 202 are arranged in a rectangular 2×4 array (i.e., two rows of four cores 202), in other embodiments such cores may be arranged in any other manner. As well understood in the art, each core 202 may convey optical signals independently of the others. In this aspect, the multicore optical fiber 200 may be functionally similar to eight individual optical fibers, each with a core and cladding, yet the diameter of the cladding 204 may be only, for example, 125 microns (also referred to as micrometers and abbreviated as "μm"). The diameter of the cable 102 may be correspondingly smaller than the diameter of a conventional 8-fiber cable, facilitating easier installation through small spaces.

Figure 3:
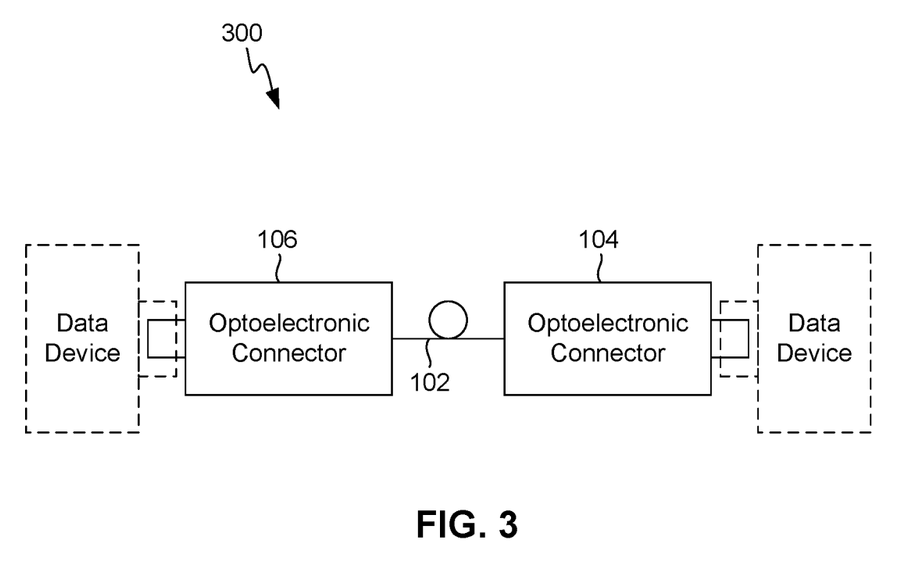
FIG. 3 is a block diagram illustrating the active optical cable of FIG. 1, showing mating of the electrical connectors with data devices.

As illustrated in FIG. 3, the connectors 104 and 106 have configurations that are electrically and mechanically mateable with mating connectors of data devices. Such data devices may be of any conventional type, including, for example, computers, data storage devices, data communication devices, etc. The connectors 104 and 106 may have any configuration, including, for example, Universal Serial Bus (USB) types (e.g., USB Type A, USB Type B, USB Type C, etc.), Thunderbolt™ Type C, etc. In the exemplary embodiments described herein, the connectors 104 and 106 may be identical. Nevertheless, in other embodiments (not shown) the connectors coupled to opposite ends of an AOC in accordance with the present disclosure may differ from each other. In still other embodiments, an AOC may have only a single connector at one end, with the other end of the cable connected directly to internal elements of a data device.

Figure 4:
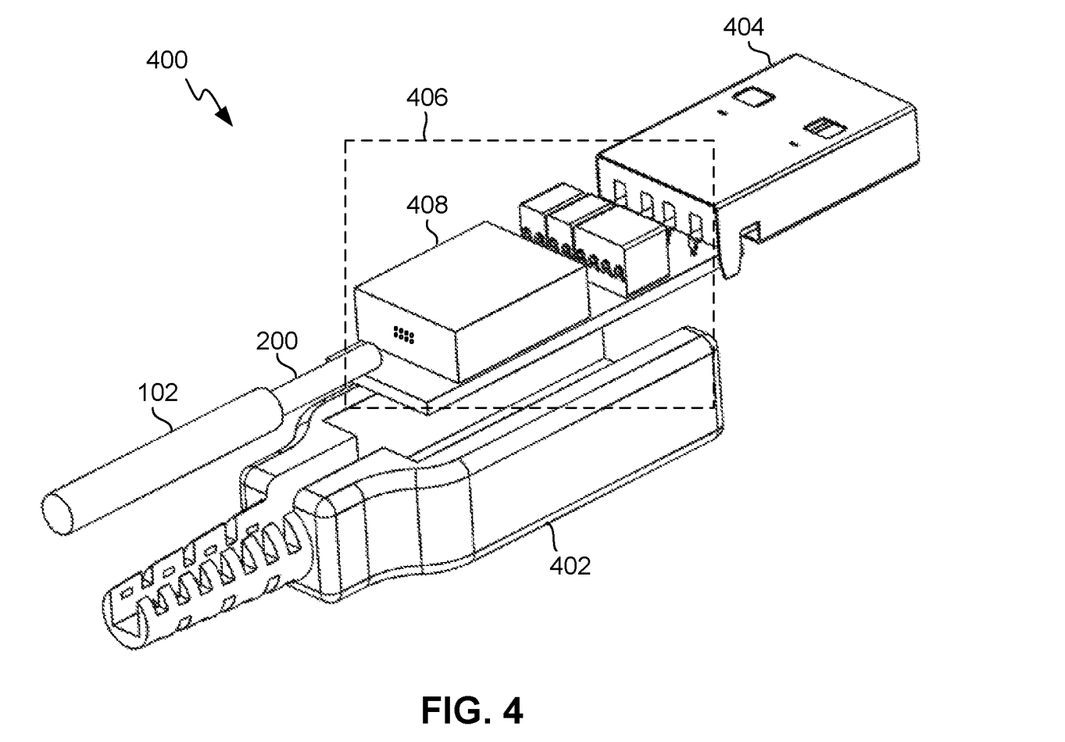
FIG. 4 is a perspective exploded view, partially cut away, of a waveguide structure and electrical connector within a connector housing, in accordance with exemplary embodiments.

As illustrated in FIG. 4, a connector 400 may be an example of the above-described connector 104 or 106 (FIG. 1). The connector 400 may include a connector housing 402. For purposes of clarity in illustrating elements mounted within the connector housing 402, only a portion of the connector housing 402 is shown (i.e., another portion is cut away). The connector housing 402 may be an overmold that encloses such elements. A portion of the cable 102 may extend rearwardly through (e.g., a strain relief portion of) the connector housing 402. The mateable, forward portion of an electrical connector 404 may extend into an opening in the connector housing 402. That is, the overmolding does not cover the mateable portion, so that it can be plugged into or otherwise mated with a data device as described above with regard to FIG. 3.

Figure 5:
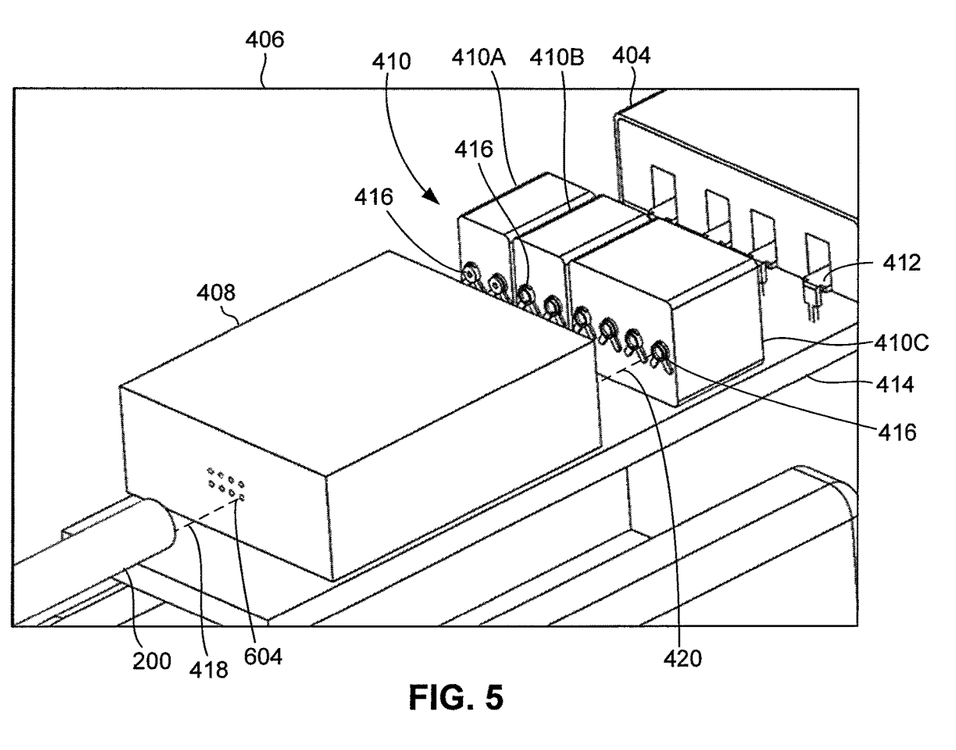
FIG. 5 is an enlargement of a portion of FIG. 4.

A region 406 of FIG. 4 is shown enlarged in FIG. 5. An optical waveguide structure 408 is configured to couple optical signals between an end of the multicore optical fiber 200 and an array of optoelectronic converter devices 410. The optoelectronic converter devices 410 may include one or more optoelectronic source devices 410A, such as, for example, VCSELs, and one or more optoelectronic detector devices 410B, such as, for example, PIN photodiodes. The optoelectronic converter devices 410 are electrically coupled to conductors 412 of the electrical connector 404. The forward portions (not shown for purposes of clarity) of the conductors 412 may extend into the mateable end portion of the electrical connector 404 and form mateable electrical contacts. The rearward portions of the conductors 412 may be connected to traces (not shown) on a printed circuit board 414 or similar substrate on which the optoelectronic converter devices 410 may be mounted, to provide the electrical coupling between the optoelectronic converter devices 410 and the conductors 412.

Each optoelectronic converter device 410 has an optically active region or face 416. Each optoelectronic source device 410A is configured to emit optical signals from its active region or face 416 in response to electrical signals received from a corresponding conductor 412 of the electrical connector 404. Although in the exemplary embodiment shown in FIGS. 4-5 there are two optoelectronic source devices 410A (which may be contained within a common housing or case), in other embodiments there may be any other number. As described below, the optoelectronic source devices 410A may be configured as data signal transmitters.

Each optoelectronic detector device 410B is configured to provide electrical signals to a corresponding conductor 412 in response to optical signals impinging upon its active region or face 416. Although in the exemplary embodiment shown in FIGS. 4-5 there are two optoelectronic detector devices 410B (which may be contained within a common housing or case), in other embodiments there may be any other number. As described below, the optoelectronic detector devices 410B may be configured as data signal receivers.

Still further optoelectronic converter devices 410C may be configured to convey power from one of the connectors 104 and 106 (FIG. 3) to the other. The optoelectronic converter devices 410C may comprise optoelectronic sources, detectors, or both. For example, the optoelectronic converter devices 410C in the connector 104 may be optoelectronic sources that convert an electrical (power) signal received from a data device (FIG. 3) to which the connector 104 is connected into an optical signal, which is then conveyed to the other connector 106. The optoelectronic converter devices 410C in the other connector 106 may be optoelectronic detector devices that convert the optical signal into an electrical signal that powers the data device to which the connector 106 is connected. Alternatively, the optoelectronic converter devices 410C in the connector 106 may be optoelectronic sources that convert an electrical (power) signal received from a data device (FIG. 3) to which the connector 106 is connected into an optical signal, which is then conveyed to the other connector 104. The optoelectronic converter devices 410C in the other connector 104 may be optoelectronic detector devices that convert the optical signal into an electrical signal that powers the data device to which the connector 104 is connected. Although in the exemplary embodiment shown in FIGS. 4-5 there are four optoelectronic converter devices 410C, in other embodiments there may be any other number.

The optoelectronic converter devices 410 may be mounted on the printed circuit board 414 or other substrate with their active regions or faces 416 arranged in an array. For example, the optoelectronic converter devices 410 may be mounted with their active regions or faces 416 arranged in a linear array. In the illustrated example, in which there are two optoelectronic source devices 410A, two optoelectronic detector devices 410B, and four other optoelectronic converter devices 410C, the array of optoelectronic converter devices 410 may have a 1×8 arrangement (i.e., one row of eight optoelectronic converter devices 410).

Figure 6A:
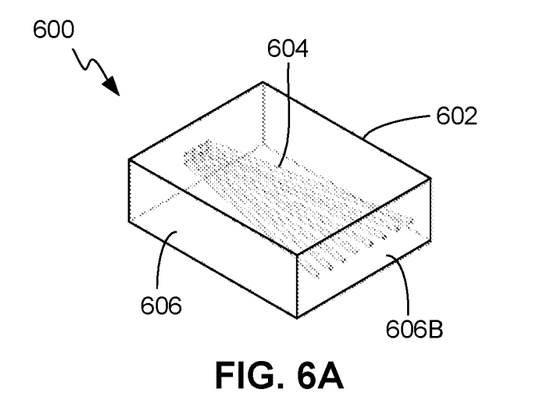
FIG. 6A is a rear perspective view of a waveguide structure, in accordance with exemplary embodiments.
Figure 6B:
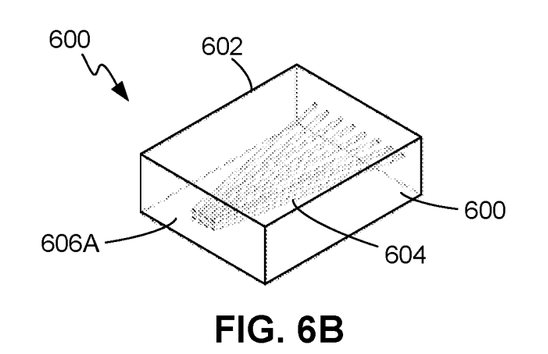
FIG. 6B is a front perspective view of a waveguide structure, in accordance with exemplary embodiments.
Figure 6C:
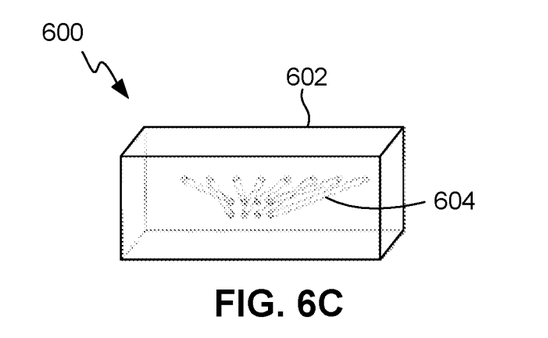
FIG. 6C is a rear isometric view of a waveguide structure, in accordance with exemplary embodiments.

As illustrated in FIGS. 6A, 6B and 6C, an optical waveguide structure 600 may comprise a glass body 602 having internally laser-written optical waveguides 604. Laser-written three-dimensional optical waveguide structures that may be configured with an arrangement of waveguides 604 as described herein are commercially available from, for example, Optoscribe Limited of Livingston, UK. The optical waveguide structure 600 may be an example of the above-described optical waveguide structure 408 (FIG. 4). In the illustrated embodiment the glass body 602 is generally box-shaped or hexahedral, characterized by six sides or faces 606. Nevertheless, in other embodiments such an etched-waveguide structure may have any other shape.

On a first face 606A (FIG. 6B) of the six faces 606, first ends of the optical waveguides 604 are arranged in an array of the same size and shape as the array in which the cores 202 are arranged, such as the rectangular 2×4 array described above with regard to FIG. 2. Although not shown for purposes of clarity, the optical axis of each of the optical waveguides 604 in the array on the first face 606A may be axially aligned with the optical axis of the end of a corresponding one of the cores 202. Arraying these ends of the optical waveguides 604 to match the array of cores 202 and aligning them in this manner may avoid the need for focusing lenses. Accordingly, in operation, as conceptually indicated by the line 418 in FIG. 5, optical signals that are emitted from the end of an optical waveguide 604 are received directly (i.e., without any intervening lenses or other optics) into the corresponding core 202, and optical signals that are emitted from the end of a core 202 are received directly into the corresponding optical waveguide 604.

On a second face 606B (FIG. 6A) of the six faces 606, second ends of the optical waveguides 604 are arranged in an array of the same size and shape as the array in which the optoelectronic converter devices 410 are arranged, such as the linear 1×8 array described above with regard to FIGS. 4-5. Although not shown for purposes of clarity, the optical axis of each of the optical waveguides 604 in the array on the second face 606B may be axially aligned with the active region or face of a corresponding one of the optoelectronic converter devices 410. Arraying these ends of the optical waveguides 604 to match the array of optoelectronic converter devices 410 and aligning them in this manner may avoid the need for focusing lenses. Accordingly, in operation, as conceptually indicated by the line 420 in FIG. 5, optical signals that are emitted from the end of an optical waveguide 604 are received directly (i.e., without any intervening lenses or other optics) into the corresponding optoelectronic detector devices 410B, and optical signals that are emitted from an optoelectronic source device 410A are received directly into the corresponding optical waveguide 604.

Between the opposing faces 606A and 606B on which the correspondingly opposing ends of the optical waveguides 604 are arrayed, the optical waveguides 604 may fan out or spread apart. That is, the ends of the optical waveguides 604 in the (e.g., 1×8) array on the second face 606B are spaced apart by a spacing that is greater than the spacing by which the ends of the optical waveguides in the (e.g., 2×4) array on the first face 606A are spaced apart. The spacing between adjacent optical waveguides in the array on the first face 606A may be, for example, on the order of tens of microns and may match the spacing between adjacent cores 202 (FIG. 2). The spacing between adjacent optical waveguides in the array on the second face 606B may be, for example, on the order of millimeters and may match the spacing between the active regions or faces of adjacent optoelectronic converter devices 410.

In operation, optical signals emitted from the ends of cores 202 enter the ends of the corresponding optical waveguides 604 at the first face 606A, are conveyed through those optical waveguides 604, and are emitted from the other ends at the second face 606B. The optical signals emitted from an optical waveguide 604 at the second face 606B impinge upon one of the optoelectronic detector devices 410B, which converts the optical signals to electrical signals and provides the electrical signals to the electrical connector 404. Conversely, the optoelectronic source devices 410A that receive electrical signals from the electrical connector 404 convert those electrical signals to optical signals and emit the optical signals toward the ends of the corresponding optical waveguides 604 on the second face 606B. The optical signals enter those optical waveguides 604, are conveyed through those optical waveguides 604 to the first face 606A, and are emitted toward the ends of corresponding cores 202. The emitted optical signals enter the ends of those cores 202 and are carried through to the other end of the multicore fiber 200. In this manner, electrical signals originating at a data device connected to one of the connectors 104 and 106 (FIG. 3) may be conveyed in optical form to the other one of the connectors 104 and 106.

Figure 7:
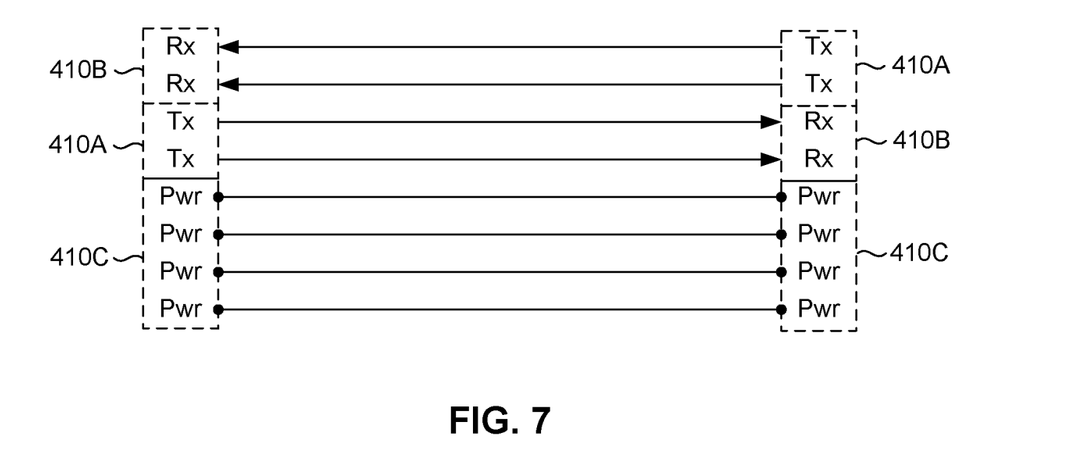
FIG. 7 illustrates an exemplary correspondence between types of optical signals and channels of the multicore fiber, in accordance with exemplary embodiments.

As illustrated in FIG. 7, and in accordance with the exemplary embodiment described above with regard to FIGS. 4-6, optoelectronic source devices 410A at a first end of a cable may serve as data transmitters (Tx) for a corresponding number of data channels and be paired with optoelectronic detector devices 410B at a second end of the cable that may serve as data receivers (Rx) for those channels. Similarly, optoelectronic source devices 410A at the second end of the cable may serve as data transmitters for a corresponding number of data channels and be paired with optoelectronic detector devices 410B at the first end of the cable that may serve as data receivers for those channels. In addition, other optoelectronic converter devices 410C at one end of the cable may be configured as power sources and be paired with still other optoelectronic converter devices 410C at the other end of the cable that may be configured as power receivers.

Figure 8:
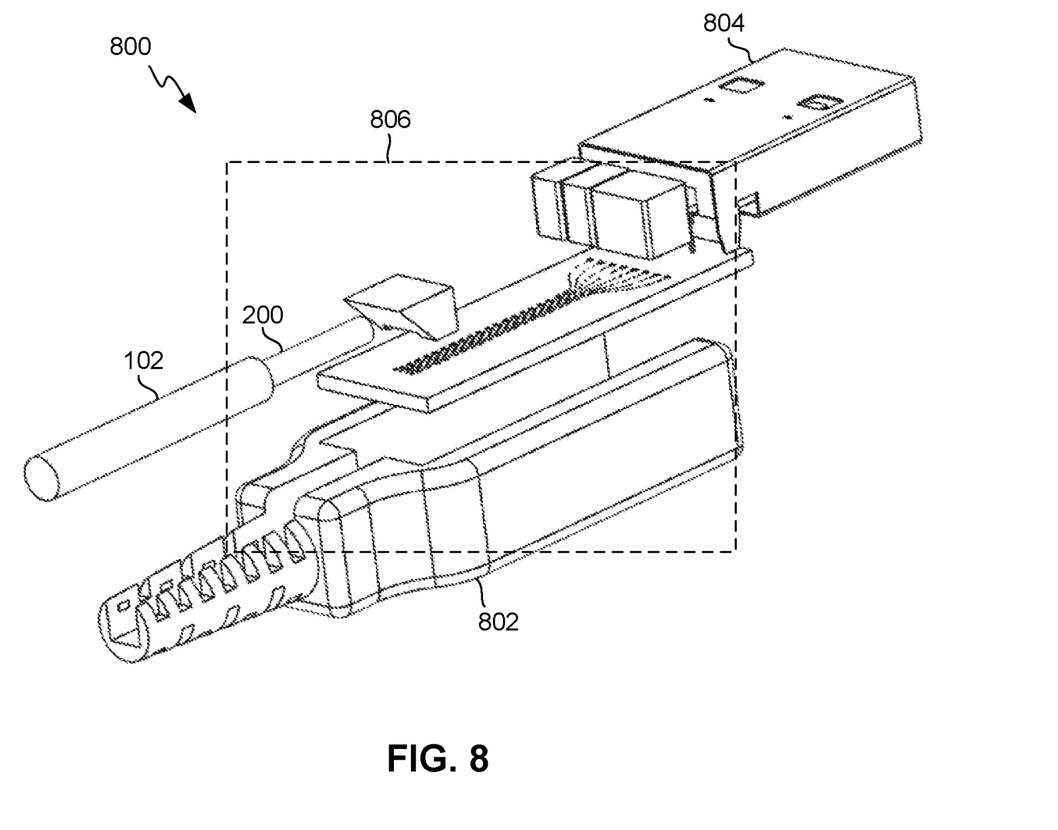
FIG. 8 is a perspective exploded view, partially cut away, of another waveguide structure and electrical connector within a connector housing, in accordance with exemplary embodiments.

As illustrated in FIG. 8, a connector 800 may be another example of the above-described connector 104 or 106 (FIG. 1). The connector 800 may include a connector housing 802. For purposes of clarity in illustrating elements mounted within the connector housing 802, only a portion of the connector housing 802 is shown (i.e., another portion is cut away). The connector housing 802 may be an overmold that encloses such elements. A portion of the cable 102 may extend rearwardly through (e.g., a strain relief portion of) the connector housing 802. The mateable, forward portion of an electrical connector 804 may extend into an opening in the connector housing 802. That is, the overmolding does not cover the mateable portion, so that it can be plugged into or otherwise mated with a data device as described above with regard to FIG. 3.

Figure 9:
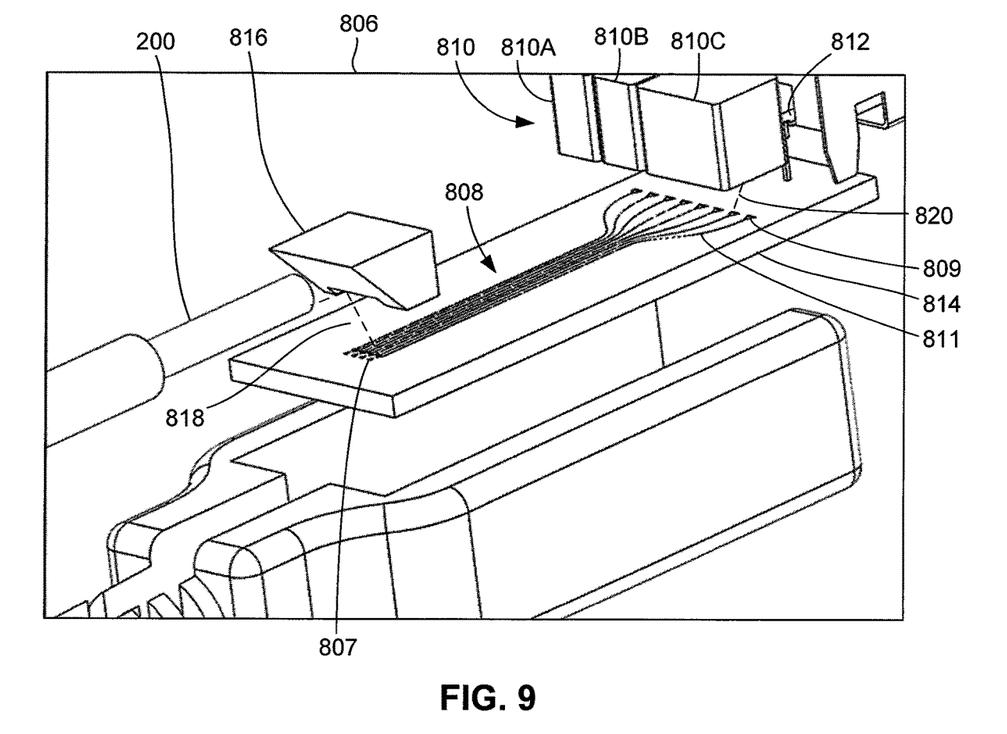
FIG. 9 is an enlargement of a portion of FIG. 8.

A region 806 of FIG. 8 is shown enlarged in FIG. 9. An optical waveguide structure 808 is configured to couple optical signals between an end of the multicore optical fiber 200 and an array of optoelectronic converter devices 810. More specifically, the optical waveguide structure 808 may include a plurality of optical waveguides 811. The optical waveguides 811 may have silicon-on-insulator (SOI) structures. As well understood in the art, an SOI structure comprises a silicon waveguide layer on top of a buried oxide layer (not separately shown). The waveguide layer and buried oxide layer function in a manner analogous to a fiber core and cladding, respectively. The waveguide layer and buried oxide layer may comprise the upper layers of a multi-layer substrate 814.

The optoelectronic converter devices 810 may include one or more optoelectronic source devices 810A, such as, for example, VCSELs, and one or more optoelectronic detector devices 810B, such as, for example, PIN photodiodes. The optoelectronic converter devices 810 are electrically coupled to conductors 812 of the electrical connector 804. The forward portions (not shown for purposes of clarity) of the conductors 812 may extend into the mateable portion of the electrical connector 804 and form mateable electrical contacts. The rearward portions of the conductors 812 may be connected to traces (not shown) within the substrate 814 on which the optoelectronic converter devices 810 may be mounted, to provide the electrical coupling between the optoelectronic converter devices 810 and the conductors 812.

Each optoelectronic source device 810A is configured to emit optical signals from its active region or face (not shown) in response to electrical signals received from a corresponding conductor 812 of the electrical connector 804. Although in the exemplary embodiment shown in FIGS. 8-9 there are two optoelectronic source devices 810A (which may be contained within a common housing or case), in other embodiments there may be any other number. As described below, the optoelectronic source devices 810A may be configured as data signal transmitters.

Each optoelectronic detector device 810B is configured to provide electrical signals to a corresponding conductor 812 in response to optical signals impinging upon its active region or face (not shown). Although in the exemplary embodiment shown in FIGS. 8-9 there are two optoelectronic detector devices 810B (which may be contained within a common housing or case), in other embodiments there may be any other number. As described below, the optoelectronic detector devices 810B may be configured as data signal receivers.

Still further optoelectronic converter devices 810C may be configured to convey power from one of the connectors 104 and 106 (FIG. 3) to the other. The optoelectronic converter devices 810C may comprise optoelectronic sources, detectors, or both. The optoelectronic converter devices 810C may be configured in a manner similar to that described above with regard to the optoelectronic converter devices 410C (FIG. 5).

The optical waveguides 811 may extend in a plane on the surface or upper layers of the substrate 814. Each optical waveguide 811 may have a first end at a first end of the optical waveguide structure 808 and a second end at a second end of the optical waveguide structure 808. The first and second ends of each optical waveguide 811 may comprise gratings 807 and 809, respectively, which are configured to redirect optical signals between a direction parallel to the plane in which the optical waveguides 811 extend and a direction forming an obtuse angle (e.g., slightly greater than 90 degrees) with the plane in which the optical waveguides 811 extend.

The optoelectronic converter devices 810 may mounted on a surface of the substrate 814 with their active regions or faces arranged in an array facing the surface. In the illustrated example, in which there are two optoelectronic source devices 810A, two optoelectronic detector devices 810B, and four other optoelectronic converter devices 810C, these optoelectronic converter devices 810 may be mounted in a 1×8 linear array facing the surface of the substrate 814.

A mirror or reflector 816 may be mounted over the substrate 814 at the first end of the optical waveguide structure 808. The reflector 816 may be configured to redirect optical signals at an obtuse angle formed between the axes of the cores 202 and a direction that allows coupling of the optical signals into the gratings at the ends of the optical waveguides 811.

At the first end of the optical waveguide structure 808, the gratings 807 may be arranged in an array of the same size and shape as the array in which the cores 202 are arranged, such as the rectangular 2×4 array described above with regard to FIG. 2. In operation, as conceptually indicated by the L-shaped line 818, optical signals that are emitted from a grating 807 at the first end of an optical waveguide 811 are redirected by the reflector 816 into the corresponding core 202, and optical signals that are emitted from the end of a core 202 are redirected by the reflector 816 onto the grating 807 at the first end of the corresponding optical waveguide 811.

At the second end of the optical waveguide structure 808, the gratings 809 may be arranged in an array of the same size and shape as the array in which the optoelectronic converter devices 810 are arranged, such as the linear 1×8 array described above. Each grating 809 may be aligned with the active region or face of a corresponding one of the optoelectronic converter devices 810. That is, the active region or face of each of the optoelectronic converter devices 810 may be positioned directly over one of the gratings 809. In operation, as conceptually indicated by the line 820, optical signals that are emitted from the grating 809 at the second end of an optical waveguide 811 are received directly into the corresponding optoelectronic detector devices 810B, and optical signals that are emitted from an optoelectronic source device 810A are received directly onto the grating 809 at the second end of the corresponding optical waveguide 811.

Between the first and second ends of the optical waveguide structure 808, the optical waveguides 811 may fan out or spread apart. That is, the second ends of the optical waveguides 811 are spaced apart by a spacing that is greater than the spacing by which the first ends of the optical waveguides 811 are spaced apart. The spacings may be similar to those described above with regard to the embodiment illustrated in FIGS. 4-5.

In operation, optical signals emitted from the ends of cores 202 are redirected by the reflector onto the gratings 807, are conveyed along those optical waveguides 811, and emitted from the gratings 809 in a direction forming an obtuse angle with the plane in which the optical waveguides 811 extend. The optical signals emitted from the gratings 809 impinge upon the optoelectronic detector devices 810B, which convert the optical signals to electrical signals and provides the electrical signals to the electrical connector 804. Conversely, the optoelectronic source devices 810A that receive electrical signals from the electrical connector 804 convert those electrical signals to optical signals and emit the optical signals toward the gratings 809. The optical signals enter those optical waveguides 811 through the gratings 809, are conveyed along those optical waveguides 811 to the gratings 807, and are emitted from the gratings 807 in a direction forming an obtuse angle with the plane in which the optical waveguides 811 extend. The emitted optical signals are redirected by the reflector 816 into the ends of cores 202 and are carried through to the other end of the multicore fiber 200.

One or more illustrative or exemplary embodiments of the invention have been described above. However, it is to be understood that the invention is defined by the appended claims and is not limited to the specific embodiments described.

What is claimed is:

1. An active optical cable, comprising:
   a multicore optical fiber having a first end and a second end, the multicore optical fiber having a plurality of cores contained within a cladding;
   a first connector housing, the first end of the multicore optical fiber extending into the first connector housing;
   a first electrical connector having a mateable portion in an opening of the first connector housing;
   a first plurality of optoelectronic converter devices in the first connector housing, each optoelectronic converter device having an optical face, each of the first plurality of optoelectronic converter devices electrically coupled to a corresponding conductor of the first electrical connector; and
   a first optical waveguide structure in the first connector housing, the first optical waveguide structure having a plurality of waveguides, each waveguide optically coupled between one of the cores and the optical face of one of the first plurality of optoelectronic converter devices.

2. The active optical cable of claim 1, wherein the first optical waveguide structure has a first end, a second end, and a plurality of optical waveguides extending between the first end and the second end, the plurality of optical waveguides arranged in a first array at the first end spaced apart from each other by a first spacing, the plurality of optical waveguides arranged in a second array at the second end spaced apart from each other by a second spacing, and the second spacing is greater than the first spacing.

3. The active optical cable of claim 2, wherein each of the optical waveguides in the first array is optically coupled with one of the cores, and each of the optical waveguides in the second array is optically coupled with the optical face of one of the optoelectronic converter devices.

4. The active optical cable of claim 3, wherein the first optical waveguide structure comprises a three-dimensional glass body having internally laser-written optical waveguides, and the first end and the second end of the first optical waveguide structure comprise opposing faces of the glass body.

5. The active optical cable of claim 4, wherein each of the optical waveguides in the first array is axially aligned with one of the cores, and each of the optical waveguides in the second array is axially aligned with the optical face of one of the optoelectronic converter devices.

6. The active optical cable of claim 3, wherein the first optical waveguide structure comprises a silicon substrate, and the optical waveguides are etched on a surface of the substrate.

7. The active optical cable of claim 6, wherein each optical waveguide has a first end at the first end of the first optical waveguide structure and a second end at the second end of the first optical waveguide structure, and the first end and the second end of each optical waveguide comprises a grating coupler etched on the surface of the substrate, the grating coupler configured to redirect optical signals between a direction parallel to the surface of the substrate and a direction forming an obtuse angle with the surface of the substrate.

8. The active optical cable of claim 1, wherein the first plurality of optoelectronic converter devices comprises at least one optoelectronic source device and at least one optoelectronic detector device.

9. The active optical cable of claim 1, further comprising:
a second connector housing, the second end of the multicore optical fiber extending into the second connector housing;
a second electrical connector having a mateable portion in an opening of the second connector housing;
a second plurality of optoelectronic converter devices in the second connector housing, each of the second plurality of optoelectronic converter devices electrically coupled to a corresponding conductor of the second electrical connector; and
a second optical waveguide structure in the second connector housing, the second optical waveguide structure having a plurality of waveguides, each waveguide optically coupled between one of the cores and the optical face of one of the second plurality of optoelectronic converter devices.

10. An active optical cable, comprising:
a multicore optical fiber having a first end and a second end, the multicore optical fiber having a plurality of cores contained within a cladding;
a connector housing, the first end of the multicore optical fiber extending into the connector housing;
an electrical connector having a mateable portion in an opening of the connector housing;
a plurality of optoelectronic converter devices in the connector housing, each optoelectronic converter device having an optical face, each of the plurality of optoelectronic converter devices electrically coupled to a corresponding conductor of the electrical connector; and
an optical waveguide structure comprising a three-dimensional glass body having a plurality of internally laser-written optical waveguides, each optical waveguide having a first end in a first array on a first face of the glass body and a second end in a second array on a second face of the glass body, the first end of each optical waveguide axially aligned with one of the cores, the second end of each optical waveguide axially aligned with the optical face of one of the optoelectronic converter devices.

11. The active optical cable of claim 10, wherein the first ends of the optical waveguides are arranged in the first array spaced apart from each other by a first spacing, the second ends of the optical waveguides are arranged in the second array spaced apart from each other by a second spacing, and the second spacing is greater than the first spacing.

12. An active optical cable, comprising:
a multicore optical fiber having a first end and a second end, the multicore optical fiber having a plurality of cores contained within a cladding;
a connector housing, the first end of the multicore optical fiber extending into the connector housing;
an electrical connector having a mateable portion in an opening of the connector housing;
a plurality of optoelectronic converter devices in the connector housing, each optoelectronic converter device having an optical face, each of the plurality of optoelectronic converter devices electrically coupled to a corresponding conductor of the electrical connector; and
an optical waveguide structure comprising a plurality of optical waveguides etched on a surface of a silicon substrate, each optical waveguide having a first end comprising a grating coupler in a first array and a second end comprising a grating coupler in a second array, the plurality of optical waveguides extending in a plane normal to the optical faces of the optoelectronic converter devices, each grating coupler in the second array aligned with the optical face of one of the optoelectronic converter devices.

13. The active optical cable of claim 12, wherein the first ends of the optical waveguides are arranged in the first array spaced apart from each other by a first spacing, the second ends of the optical waveguides are arranged in the second array spaced apart from each other by a second spacing, and the second spacing is greater than the first spacing.

14. The active optical cable of claim 12, further comprising a reflector configured to redirect optical signals between the grating couplers in the first array and the cores.

* * * * *